(12) United States Patent
Adhikari et al.

(10) Patent No.: US 8,302,179 B2
(45) Date of Patent: Oct. 30, 2012

(54) EMBEDDED FIREWALL AT A TELECOMMUNICATIONS ENDPOINT

(75) Inventors: Akshay Adhikari, Basking Ridge, NJ (US); Sachin Garg, Green Brook, NJ (US); Anjur Sundaresan Krishnakumar, Rocky Hill, NJ (US); Navjot Singh, Denville, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1196 days.

(21) Appl. No.: 11/610,485

(22) Filed: Dec. 13, 2006

(65) Prior Publication Data
US 2008/0148384 A1 Jun. 19, 2008

(51) Int. Cl.
G06F 21/00 (2006.01)
(52) U.S. Cl. ......................................................... 726/13
(58) Field of Classification Search .................... 726/11, 726/13; 713/154
See application file for complete search history.

(56) References Cited

U.S. PATENT DOCUMENTS

| | | | |
|---|---|---|---|
| 6,594,268 B1 | 7/2003 | Aukia et al. | |
| 6,678,827 B1 | 1/2004 | Rothermel et al. | |
| 7,096,495 B1 | 8/2006 | Warrier et al. | |
| 7,188,363 B1 * | 3/2007 | Boutros et al. | 726/13 |
| 7,284,269 B2 * | 10/2007 | Marquet et al. | 726/13 |
| 7,536,573 B2 | 5/2009 | Schumacher et al. | |
| 2002/0053024 A1 | 5/2002 | Hashimoto et al. | |
| 2002/0099831 A1 | 7/2002 | Tsunogai | |
| 2002/0138643 A1 | 9/2002 | Shin et al. | |
| 2003/0028806 A1 | 2/2003 | Govindarajan et al. | |
| 2003/0056226 A1 * | 3/2003 | Lazarus et al. | 725/129 |
| 2003/0167410 A1 | 9/2003 | Rigstad et al. | |
| 2004/0064738 A1 | 4/2004 | Kanno et al. | |
| 2004/0205359 A1 | 10/2004 | Matsuhira | |
| 2004/0223457 A1 * | 11/2004 | Oran | 370/230 |
| 2004/0230830 A1 | 11/2004 | Ogawa et al. | |
| 2005/0022010 A1 * | 1/2005 | Swander et al. | 713/201 |

(Continued)

FOREIGN PATENT DOCUMENTS
EP 1 533 977 5/2005
(Continued)

OTHER PUBLICATIONS

Tabery P., "EP Application No. 07023662.5 Summons to Oral Proceedings Jun. 9, 2009", , Publisher: EPO, Published in: EP.

(Continued)

Primary Examiner — Jeffrey Pwu
Assistant Examiner — Anthony Brown
(74) Attorney, Agent, or Firm — Maldjian Law Group LLC; John P. Maldjian, Esq.; Alexander D. Walter, Esq.

(57) ABSTRACT

A method is disclosed that enables the implementation of an embedded firewall at a telecommunications endpoint. In particular, the illustrative embodiment of the present invention addresses the relationship between the application, firewall engine, and packet-classification rules database that are all resident at the endpoint. In the variations of the illustrative embodiment that are described herein, the application: (i) directly communicates with the co-resident firewall engine such as through local message passing, (ii) shares memory with the firewall engine, and (iii) makes socket calls to the operating system that are intercepted by a middleware layer that subsequently modifies the rules database, depending on the socket call. The common thread to these techniques is that the application, firewall engine, and rules database are co-resident at the endpoint, which is advantageous in the implementation of the embedded firewall.

21 Claims, 8 Drawing Sheets

U.S. PATENT DOCUMENTS

| | | | |
|---|---|---|---|
| 2005/0276281 A1* | 12/2005 | Jones | 370/469 |
| 2006/0007871 A1* | 1/2006 | Welin | 370/252 |
| 2007/0022474 A1* | 1/2007 | Rowett et al. | 726/11 |

FOREIGN PATENT DOCUMENTS

| | | | |
|---|---|---|---|
| GB | 2 426 422 A1 | | 11/2006 |
| JP | 2000286896 | | 10/2000 |
| JP | 2002141936 | | 5/2002 |
| JP | 2002222123 | | 8/2002 |
| JP | 2004164553 | | 6/2004 |
| JP | 2004248185 | | 9/2004 |
| JP | 2004341922 | | 12/2004 |
| JP | 2004356953 | | 12/2004 |
| JP | 2005018769 | A | 1/2005 |
| JP | 2006023934 | A | 1/2006 |
| JP | 2006086569 | | 3/2006 |
| WO | 02/19644 | A1 | 3/2002 |
| WO | WO 02/100062 | A2 | 12/2002 |
| WO | WO 02/103982 | | 12/2002 |

OTHER PUBLICATIONS

Tabery, Peter, "European Patent Application 07023662.5-2413 Search Report" Mar. 26, 2008; Publisher: European Patent Office.

Tabery, Peter, "EP Application No. 07023662 Office Action Sep. 23, 2009"Publisher: EPO, Published in: EP.

"EP Application No. 07 023 662.5-2413 Office Action Nov. 3, 2009", , Publisher: EPO, Published in: EP.

Tabery, Peter, "EP Application No. 09013268.9-2413 European Search Report Dec. 4, 2009". . Publisher: EPO, Published in: EP.

Ishibashi et al., "A Protection Method against Unauthorized Access and/or Address Spoofing for Open Network Access Systems", "Transactions of Information Processing Society of Japan", Dec. 1999, pp. 2-12, vol. 40, No. 12, Publisher: Information Processing Society of Japan, Published in: JP.

Ibato, F., "JP Application No. 2007-321665 Office Action May 8, 2010", , Publisher: JPO, Published in: JP.

Sachin Garg, "Efficient Embedded Firewall for Communication Appliances," Jun. 29, 2005, 2 pages.

PTO/SB/08A from U.S. Appl. No. 11/157,880, citing: "Security in the era of EC" Nikkei Internet Technology, Japan, Nikkei Business Publications, Inc., Sep. 22, 2000, p. 21-37; 1 page.

Yamamoto Atsunori, "Detecting DRDoS Attacks with Bidirectional Packet Confirmation," Aug. 27, 2004, Retrieved on Jan. 25, 2012 from http://sciencelinks.jp/j-east/display.php?id=000020042304A0787546, 2 pages.

D. Bruschi et al., "S-ARP: a secure address resolution protocol," Computer Security Applications Conference, 2003. Proceedings. 19th Annual Dec. 8-12, 2003, Piscataway, NJ, USA, IEEE, Dec. 8, 2003, 9 pages.

CISCO: "Configuring Dynamic ARP Inspection" Cisco, [Online] Mar. 30, 2005, 16 pages.

International Engineering, H.323 Tutorial, Retrieved on Jan. 25, 2012 from ftp://ftp.wintel.fi/manuals/VoIP/Trillium323.pdf, 30 pages.

D. Richard Kuhn et al., "Security Consideration for Voice Over IP Systems," Recommendations of the National Institute of Standards and Technology, NIST SP 800-58, Voice over IP Security, Jan. 2005, 99 pages.

* cited by examiner

EMBEDDED FIREWALL AT A TELECOMMUNICATIONS ENDPOINT

CROSS REFERENCE TO RELATED APPLICATIONS

The underlying concepts, but not necessarily the language, of the following application are incorporated herein by reference:

U.S. patent application Ser. No. 11/157,880, filed Jun. 21, 2005. If there are any contradictions or inconsistencies in language between the present application and the application that has been incorporated by reference that might affect the interpretation of the claims in the present application, the claims in the present application should be interpreted to be consistent with the language in the present application.

FIELD OF THE INVENTION

The present invention relates to telecommunications in general, and, more particularly, to providing an embedded firewall at a telecommunications endpoint.

BACKGROUND OF THE INVENTION

Figure 1:
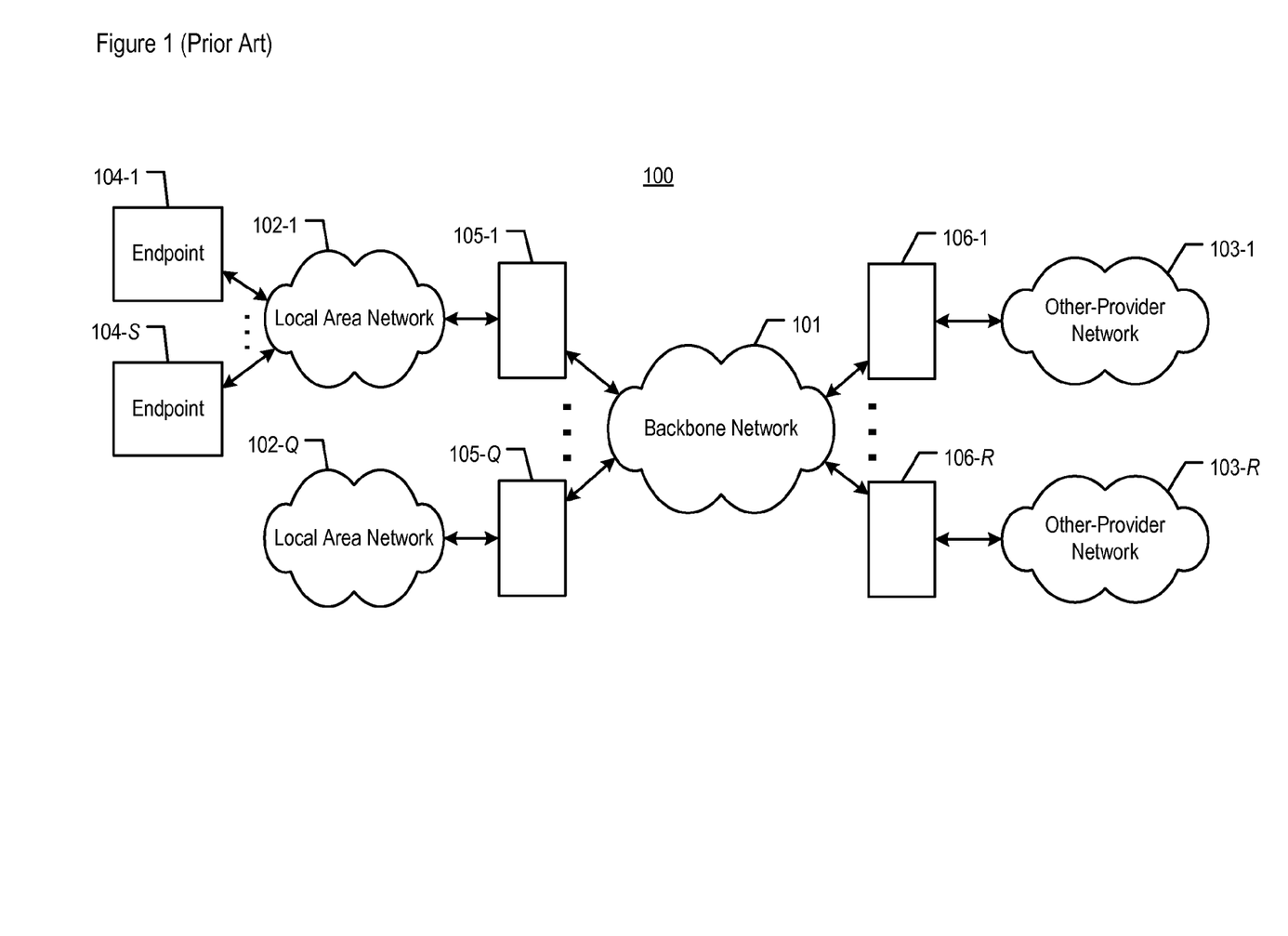
FIG. 1 depicts a schematic diagram of telecommunications system 100 in the prior art.

FIG. 1 depicts a schematic diagram of telecommunications system 100 in the prior art. System 100 routes voice conversations, or other types of media such as video, between network elements such as telecommunications endpoints. Telecommunications system 100 comprises:
  i. backbone packet network 101;
  ii. local area networks (LAN) 102-1 through 102-Q, wherein Q is a positive integer;
  iii. other-provider networks 103-1 through 103-R, wherein R is a positive integer;
  iv. telecommunications endpoints 104-1 through 104-S, wherein S is a positive integer;
  v. routers 105-1 through 105-Q; and
  vi. gateways 106-1 through 106-R.

All of the elements depicted in FIG. 1 are interconnected as shown. As can be seen, system 100 comprises a plurality of different types of networks, including backbone packet network 101, local area networks 102-$q$ for q=1 through Q, and other-provider networks 103-$r$ for r=1 through R.

Backbone packet network 101 is used to transport one or more types of media, such as Voice over Internet Protocol (or "VoIP"), for the subscribers of a particular service provider. Network 101 itself comprises one or more transmission-related nodes such as routers that are used to direct data packets (e.g., voice packets, etc.) from one or more sources to the correct destinations of those packets. Network 101 is capable of handling Internet Protocol-based messages that are transmitted among the network elements that have access to network 101, such as the various telecommunications endpoints and gateways throughout system 100. Although network 101 as depicted is a Voice-over-IP service provider's network, network 101 could alternatively be the Internet or some other type of Internet Protocol-based network.

Local area network (or "LAN") 102-$q$ provides for the local distribution of signals, such as in an enterprise system, and comprises networking equipment such as hubs, bridges, and switches between backbone packet network 101 and telecommunications endpoints 104-1 through 104-S. LAN 102 operates in accordance with a networking protocol such as Ethernet or IEEE 802.3.

Other-provider network 103-$r$ is used to transport one or more types of media, such as Voice over Internet Protocol (or "VoIP"), for the subscribers of a different service provider than that of backbone network 101, where each network 103-$r$ can belong to a different service provider from one other. Network 103-$r$ comprises one or more transmission-related nodes such as routers or switches that are used to direct signals from one or more sources to the correct destinations of those signals. For example, network 103-1 can be the Public Switched Telephone Network (PSTN), which is capable of handling either analog or digital bearer information in circuit-switched calls among devices; meanwhile, network 103-2 can be another type of circuit-based or packet-based network, such as an Internet Protocol-based network or network based on an entirely different protocol; and so on.

Backbone 101 is connected with the various other networks via different types of networking devices, such as routers and gateways. Router 105-$q$ is a networking device that connects backbone 101 with corresponding LAN 102-$q$ by forwarding data packets between the two networks. Router 105-$q$ routes packets at the network layer (i.e., layer 3) of the Open System Interconnection (OSI) reference model. Meanwhile, gateway 106-$r$ is a networking device that connects backbone 101 with the gateway's corresponding network 103-$r$ by forwarding data packets between the two networks. Gateway 106-$r$ differs from router 105-$q$ in that the gateway acts as a translator between two different types of networks. For example, gateway 106-1 interconnects and acts as a translator between backbone network 101, which is a packet-switched network, and other-provider network 103-1, which is the circuit-switched PSTN described earlier. Because gateway 106-$r$ connects two different types of networks together, one of its main functions is to convert between the different transmission and coding techniques used across the two networks.

Telecommunications endpoint 104-$s$, for s=1 through S, is a communication appliance such as a deskset, a conferencing unit, a wireless terminal, a desktop or portable computer (i.e., "softphone"), an Internet phone, and so forth. As depicted, endpoint 104-$s$ operates in a local area network. Endpoint 104-$s$ is capable of digitizing voice signals from its user and formatting the digitized signals into transmittable data packets through an audio compressor/decompressor (or "CODEC") circuit. Similarly, the CODEC circuit of endpoint 104-$s$ is also capable of receiving data packets and converting the information contained within those packets into voice signals that are understandable by the endpoint's user.

Telecommunications endpoint 104-$s$ is a packet-based device that is capable of exchanging information with any other device in telecommunications system 100, in a manner similar to how a personal computer is able to exchange information with other computers throughout the Internet. Consequently, endpoint 104-$s$ is vulnerable to many of the same or similar packet attacks as a personal computer, such as "Denial-of-Service" (DoS) attacks. As is apparent in FIG. 1, there are many sources of potential packet attacks that can be directed at endpoint 104-$s$ from within any of the networks in system 100. And in comparison to the personal computer, endpoint 104-$s$ is particularly vulnerable because of the endpoint's inherent imbalance between its networking capacity and processing power. The imbalance means that a flood of packets can easily disrupt the processor of a packet-based phone before the phone's networking ability becomes impaired.

Firewalls are able to filter out some malicious packets and can be used in VoIP networks, similar to how they are used in computer data networks. The firewalls, either software or hardware in nature, are mainly deployed at the periphery of the network (i.e., the "network-edge") to attempt to limit the amount of malicious packets from reaching the endpoints; for example, firewalls can be deployed at routers 105-1 through 105-Q and at gateways 106-1 through 106-R. However, implementing a firewall at a network-edge device is disadvantageous for various reasons. First, a network-edge firewall is only able to protect against malicious traffic that originates beyond the network's edge, not within the network itself. Second, as it often takes little added network traffic to disrupt a Voice-over-IP endpoint, a network-edge firewall might be inadequate to monitor traffic for each and every endpoint in a particular zone. And third, a network-edge firewall lacks specific knowledge that only an endpoint might have, thereby making the network-edge firewall an imperfect monitor of packets. As a result, firewalls that are "embedded" at the endpoints themselves are becoming increasingly necessarily to effectively thwart malicious packet attacks.

It is important to integrate the software firewall process that executes at an endpoint with the pre-existing telephony applications at the endpoint in such as way as to avoid or minimize any adverse effects on the endpoint's performance.

SUMMARY OF THE INVENTION

The present invention enables the implementation of an embedded firewall at a telecommunications endpoint. In particular, the illustrative embodiment of the present invention addresses the relationship between the application, firewall engine, and packet-classification rules database that are all resident at the endpoint. In the variations of the illustrative embodiment that are described herein, the application: (i) directly communicates with the co-resident firewall engine such as through local message passing, (ii) shares memory with the firewall engine, and (iii) makes socket calls to the operating system that are intercepted by a middleware layer that subsequently modifies the rules database, depending on the socket call. The common thread to these techniques is that the application, firewall engine, and rules database are co-resident at the endpoint, which is advantageous in the implementation of the embedded firewall, as described below.

The application being protected by the firewall embedded at the endpoint often has the best knowledge about what kind of traffic is legitimate, and hence it can directly control the firewall based on this knowledge. Since the application and firewall engine software components are co-resident, communication between them is more efficient than if the two software components were resident at separate network elements. For example, suppose that the application software is the only component at the endpoint that is permitted to receive, from an external source, information such as an authentication code that is designed to unlock encrypted packets. In accordance with the illustrative embodiment, the application could easily make available the authentication code to the firewall engine through shared memory that is internal to the endpoint. In contrast, a network-edge firewall in the prior art would be unable to access the local memory at the endpoint; consequently, the edge firewall would be unaware of the shared key and authentication codes and, therefore, would be unable to filter out malicious packets that appear to be encrypted.

To avoid or minimize changes to the application software, a middleware layer is inserted between the application and the operating system at the endpoint, where the middleware layer intercepts socket calls and makes changes dynamically to the rules database, based on the socket calls being intercepted. In contrast, while a network-edge firewall in the prior art is also able to establish changeable rules, it does so by tracking the connection state based on packet streams, rather than by capturing socket calls, since the edge firewall is not co-resident with the application. The implication is that the network-edge firewall in the prior art is only able to establish changeable rules for outbound connections that are initiated by the application, not for connections that are initiated by devices that are external to the application.

The illustrative embodiment of the present invention comprises: executing a firewall engine and an application at an endpoint at which ingress packets are received and handled; when a state change in the operational state of the application occurs during the execution of the application, notifying the firewall engine of the state change; and filtering at least one of the ingress packets, based on a first set of packet-classification rules that comprises a first rule, wherein the selection of the first set of packet-classification rules is based on the state change.

DETAILED DESCRIPTION

Figure 2:
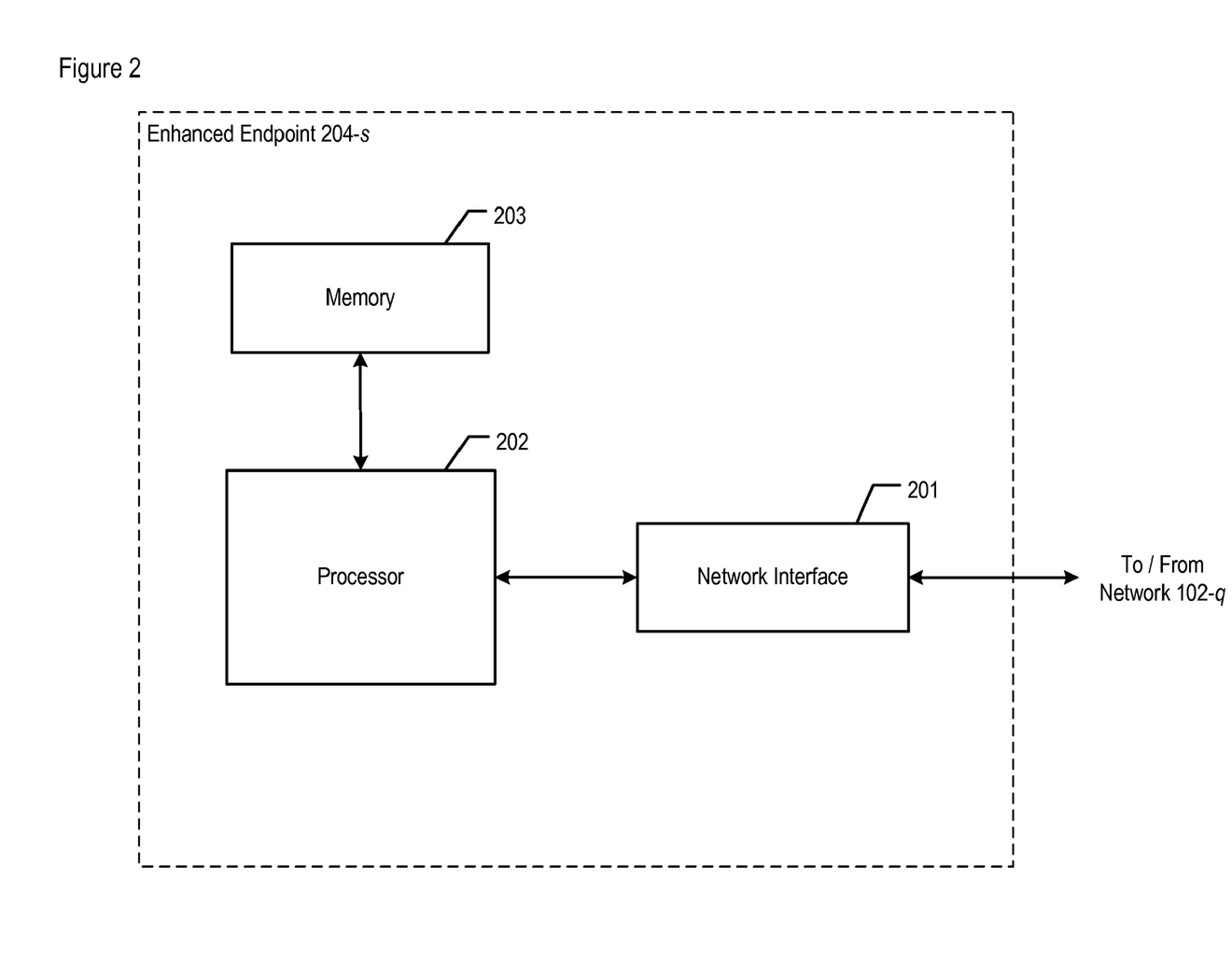
FIG. 2 depicts the salient hardware components of enhanced telecommunications endpoint 204-s in accordance with the illustrative embodiment of the present invention.

FIG. 2 depicts the salient hardware components of enhanced telecommunications endpoint 204-s in accordance with the illustrative embodiment of the present invention. Endpoint 204-s comprises network interface 201, processor 202, and memory 203, interconnected as shown and described below. Enhanced endpoint 204-s is a communication appliance that provides access to a telecommunications system for its user, in a similar way to how endpoint 104-s provides access to system 100 for its user. In the illustrative embodiment, endpoint 204-s operates in a local area network (i.e., network 102-q); in some alternative embodiments, the endpoint operates in a different type of network (e.g., cellular, etc.). Endpoint 204-s can be one of various types of communication appliances that include a deskset, a conferencing unit, a cellular telephone, a desktop or portable computer (i.e., "softphone"), and so forth. As with endpoint 104-s, telecommunications endpoint 204-s is capable of digitizing voice signals from its user and formatting the digitized signals into transmittable data packets through an audio compressor/decompressor (or "CODEC") circuit. Similarly, the CODEC circuit of endpoint 204-s is also capable of receiving data packets and converting the information contained within those packets into voice signals that are understandable by the endpoint's user.

In addition to the functionality exhibited in prior-art endpoint **104-*s*, telecommunications endpoint 204-*s* is further capable of performing the tasks described below and with respect to FIGS. 6 through 8**, in accordance with the illustrative embodiment of the present invention.

Network interface 201 is capable of receiving packet signals from its associated network, such as incoming packets from other Internet Protocol-capable devices, and of forwarding the information encoded in the signals to processor 202, in well-known fashion. Network interface 201 is also capable of receiving information from processor 302 and of transmitting signals that encode this information to other Internet Protocol-capable devices via the network, in well-known fashion. It will be clear to those skilled in the art, after reading this specification, how to make and use network interface 201.

Processor 202 is a general-purpose processor that is capable of receiving information from interface 201, executing instructions stored in memory 203, reading data from and writing data into memory 203, executing the tasks described below and with respect to FIGS. 6 through 8, and transmitting information to interface 201. In some alternative embodiments of the present invention, processor 202 might be a special-purpose processor. In either case, it will be clear to those skilled in the art, after reading this specification, how to make and use processor 202.

Memory 203 stores the instructions and data used by processor 202. More specifically, memory stores the software applications, firewall engine, rules database, middleware layer, and operating system that are described below and with respect to FIGS. 3 through 5, and executed or used by processor 202. Memory 203 might be any combination of dynamic random-access memory (RAM), flash memory, disk drive memory, and so forth. It will be clear to those skilled in the art, after reading this specification, how to make and use memory 203.

Figure 3:
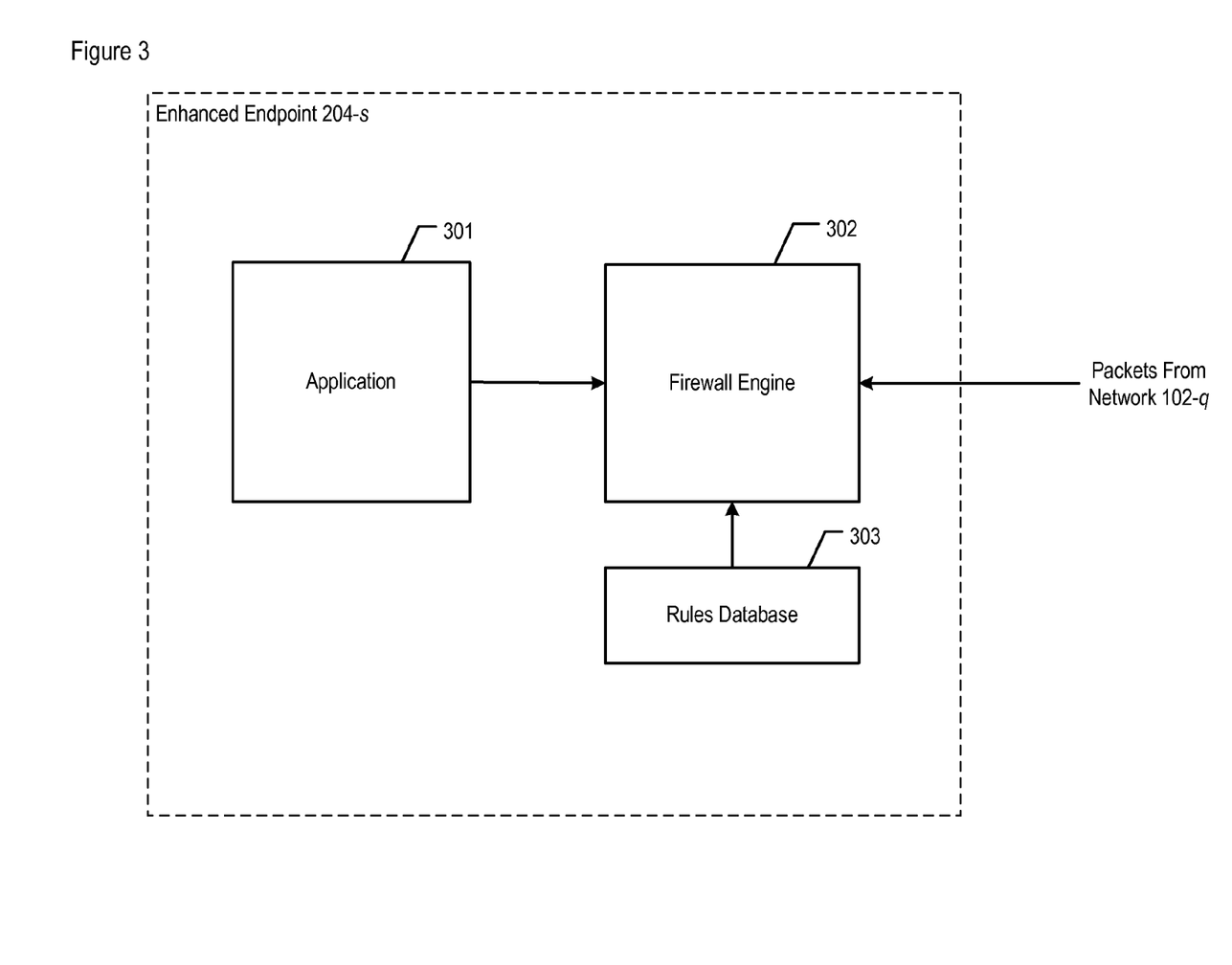
FIG. 3 depicts the salient software components of endpoint 204-s in accordance with a first variation of the illustrative embodiment.
Figure 4:
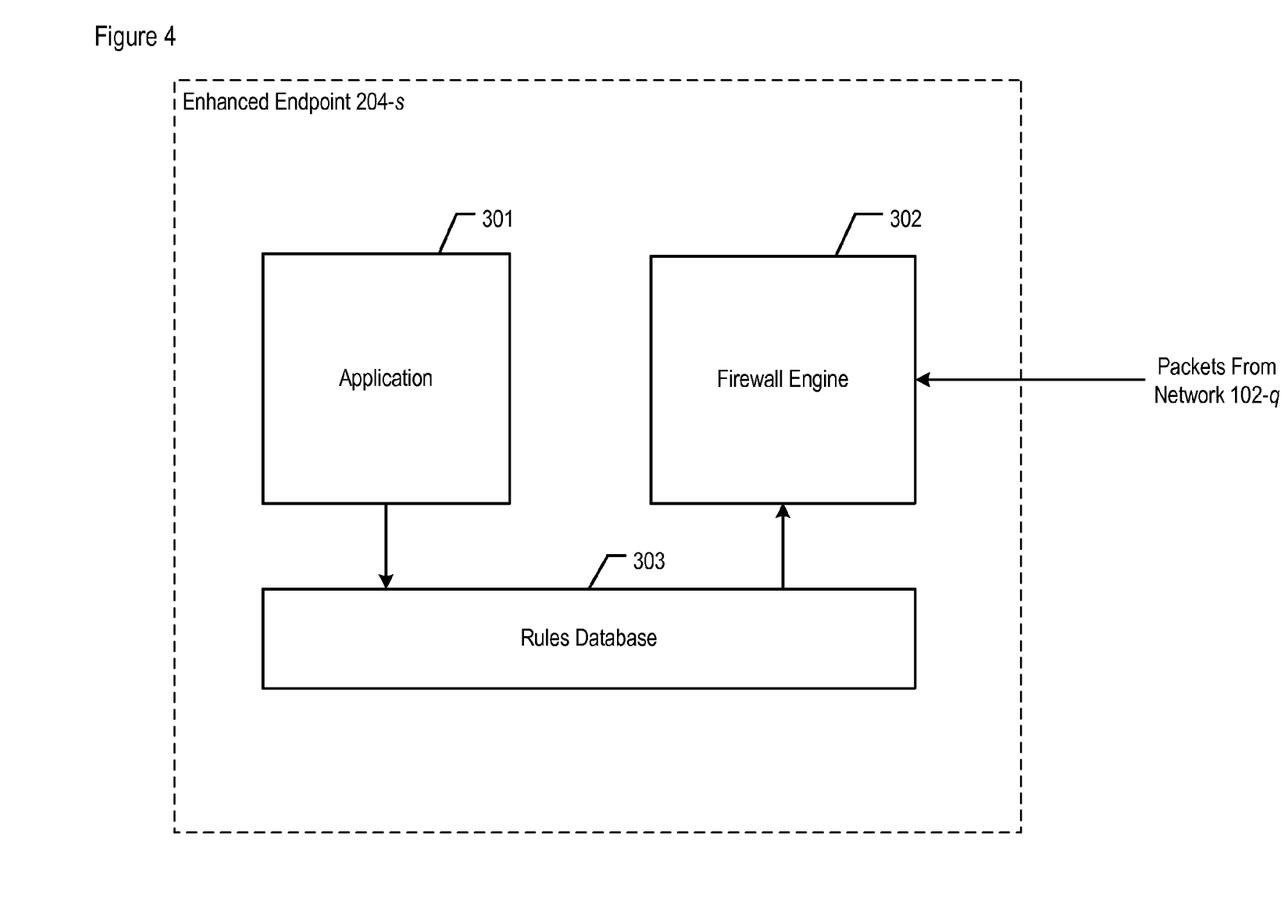
FIG. 4 depicts the salient software components of endpoint 204-s in accordance with a second variation of the illustrative embodiment.
Figure 5:
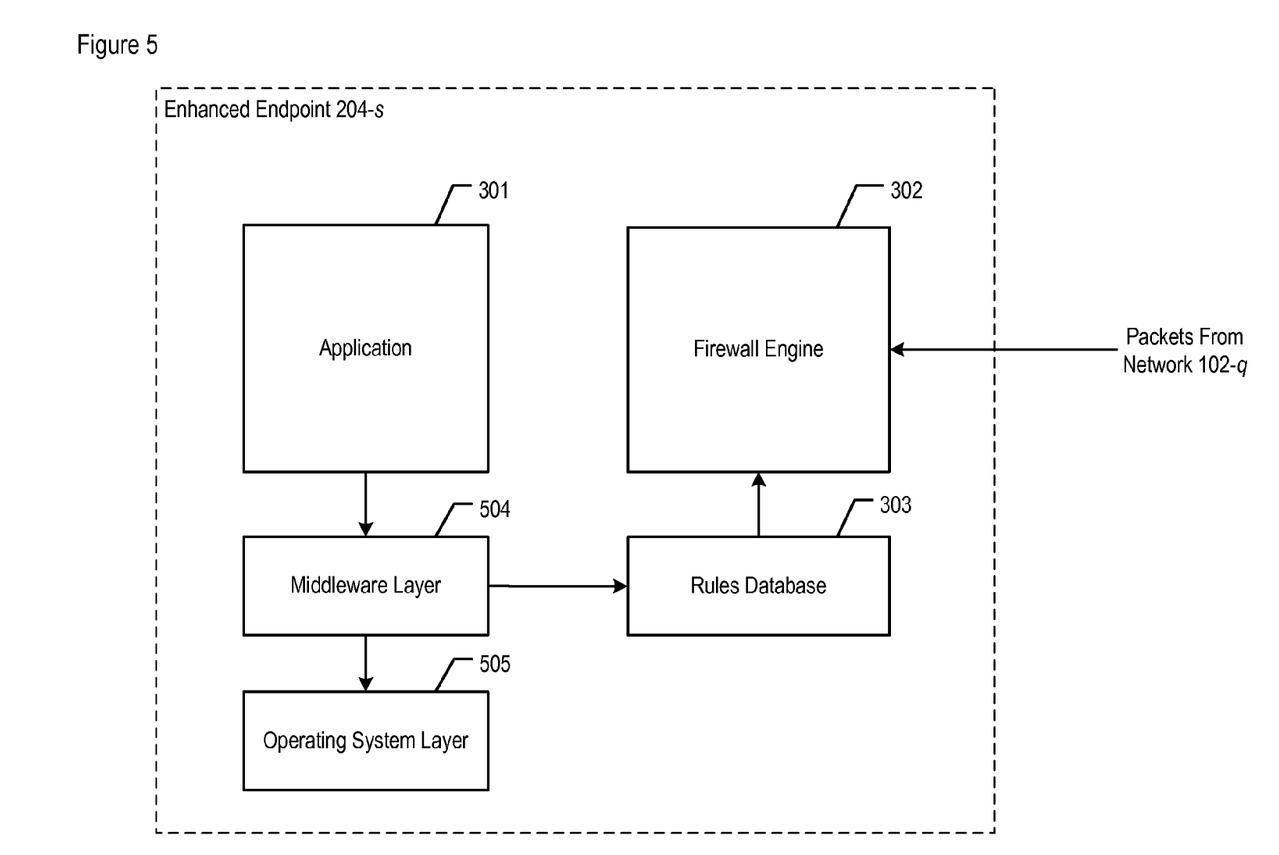
FIG. 5 depicts the salient software components of endpoint 204-s in accordance with a third variation of the illustrative embodiment.

FIGS. 3 through 5 depict the salient software components of enhanced telecommunications endpoint **204-*s*, in accordance with different variations of the illustrative embodiment of the present invention. Each figure depicts an application, a firewall engine, and a rules database, all of which are resident at endpoint 204-*s*. The depicted application carries out some useful task or tasks that are consistent with the purpose of the endpoint itself, such as providing call-control for the calls that are handled by the endpoint. The depicted firewall engine serves as a filter of the ingress (i.e., incoming) packets, as well as possibly the egress (i.e., outgoing) packets, for the purpose of limiting the exposure of endpoint 204-*s*** to an attack. The depicted packet-classification rules database consists of the fields, values, and actions for each packet classification, and is used by the firewall to determine how to examine each packet and what the appropriate action is to take.

Each of FIGS. 3 through 5 represents a different variation of how an embedded firewall can be implemented, relative to the other software components present. FIG. 3 represents a first variation in which the application has the ability to signal its current state to the firewall engine. FIG. 4 represents a second variation in which the application has the ability to populate the rules database. And FIG. 5 represents a third variation in which a middleware layer, or equivalent, has the ability to populate the rules database. As those who are skilled in the art will appreciate, after reading this specification, one or more of the described variations can be present at the same endpoint and can interact with each other. Furthermore, one or more of the described variations can be present with other variations of a firewall embedded with other software components at an endpoint.

FIG. 3 depicts the salient software components of enhanced telecommunications endpoint **204-*s* in accordance with the first variation of the illustrative embodiment of the present invention. Endpoint 204-*s* comprises application 301, firewall engine 302, and rules database 303**, interrelated as shown and described below.

In this first variation, application 301 has distinct operational states, and different sets of firewall rules apply in each state. Application 301 is able to signal a change of state to firewall engine 302. Engine 302 restricts the rules from rules database 303 that are applied to each incoming packet to only that subset which applies in the current state; engine 302 also discards packets that are not explicitly allowed by the applicable rule set. The reduced set of rules that firewall engine 302 must process increases the firewall's efficiency.

For example, a phone application running at endpoint **204-*s*** can exhibit at least the following operational states:

i. the booting state of application 301, in which only signaling messages from a specific network node, such as a gatekeeper, and trivial file transfer protocol (TFTP) packets that possibly contain a new load image should be accepted.

ii. the discovery state, in which only signaling messages that are consistent with endpoint **204-*s*** searching for and registering with a gatekeeper should be accepted.

iii. the on-hook state, in which only signaling messages (e.g., heartbeats, etc.) from the gatekeeper should be accepted.

iv. the off-hook state, in which only media and signaling traffic should be allowed.

FIG. 4 depicts the salient software components of enhanced telecommunications endpoint **204-*s* in accordance with the second variation of the illustrative embodiment of the present invention. Endpoint 204-*s* comprises application 301, firewall engine 302, and rules database 303**, interrelated as shown and described below.

In this second variation, application 301 has its own rules for determining which packets are legitimate and, consequently, is the only entity that can specify them. In this variation, application 301 can directly populate rules database 303 to enforce these rules. As an example, consider the Secure Real-time Transport Protocol (SRTP), which is a mechanism to guarantee the authenticity, integrity, and secrecy of voice packets. Application 303 expects to receive a four-byte authentication code, which is based on a shared key that is negotiated during call setup, for every voice packet. If the authentication code received in the packet is not the expected one, the packet is considered illegitimate and discarded. This can be directly implemented as a firewall rule, in which the incoming voice packet is allowed only if its authentication code matches one of those specified in the rule. In accordance with the illustrative embodiment, application 301 writes the authentication code rule to rules database 303, in memory that is accessible by firewall engine 302. The engine matches the authentication codes of various packets against the list.

FIG. 5 depicts the salient software components of enhanced telecommunications endpoint **204-*s* in accordance with the third variation of the illustrative embodiment of the present invention. Endpoint 204-*s* comprises application 301, firewall engine 302, rules database 303, middleware layer 504, and operating system layer 505**, interrelated as shown and described below.

In this third variation, application 301 and firewall 302 are co-resident, thereby enabling the presence of middleware layer 504 at endpoint 204-*s*. Middleware layer 504 dynamically populates rules database 303 by intercepting socket library calls, as are known in the art, made by application 301 to operating system layer 505.

As an example, when application 301 issues a "connect (socket, ip, port)" call to connect to a remote device, middleware 504 intercepts this call and temporarily establishes a rule in database 303 to allow packets from the remote (ip, port) address. If the connection handshake succeeds, middleware layer 504 allows the rule to remain; otherwise, middleware layer 504 deletes the rule from the database. Similarly, when application 301 later issues a call to close the socket, middleware layer 504 deletes the rule.

As a second example, when application 301 makes a "bind (socket, port=1234)" call, to be able to receive packets on port 1234, middleware layer 504 intercepts the call and populates rules database 303 with a rule to allow packets destined to the device at port 1234. When application 301 later issues a call to close the socket, middleware layer 504 deletes the rule from the database. Thus, middleware layer 504 is able to add rules to or remove rules from database 303 without placing a burden on the application programmer.

Figure 6:
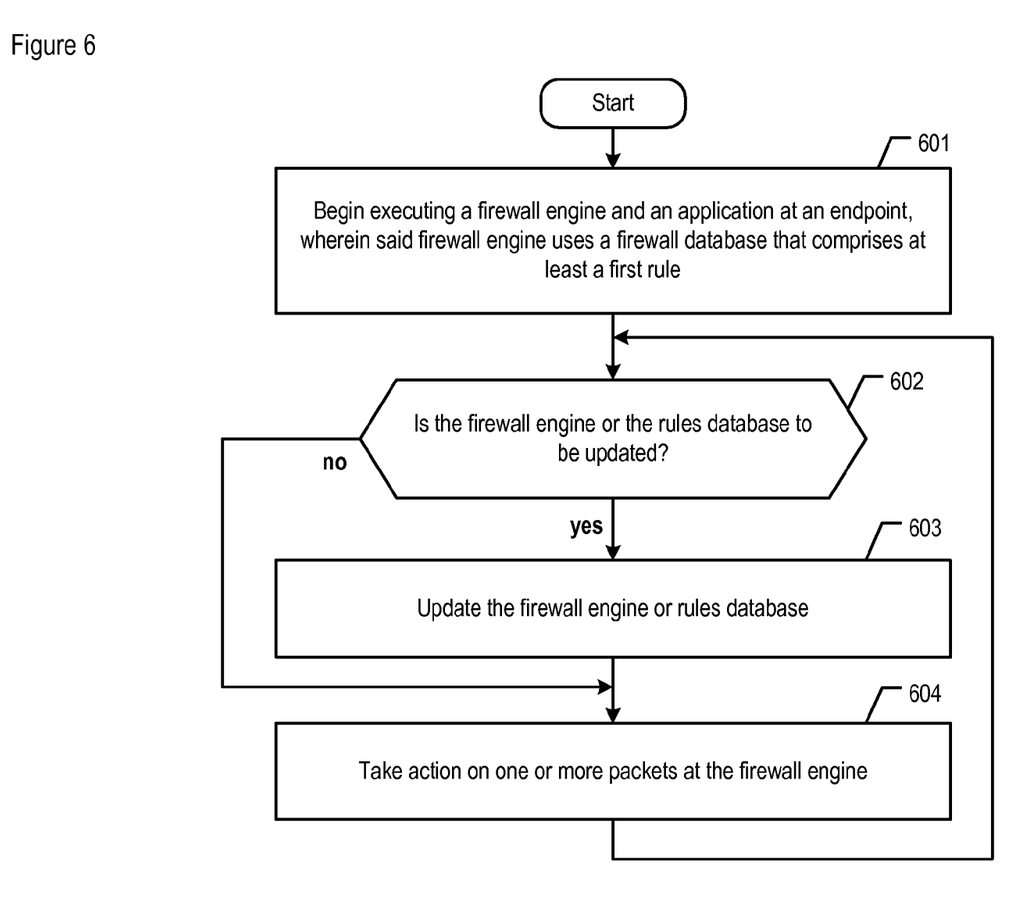
FIG. 6 depicts a set of tasks that are executed by endpoint 204-s, in determining a resident firewall engine or rules database is to be updated for the purpose of managing ingress packets, in accordance with the illustrative embodiment of the present invention.
Figure 7:
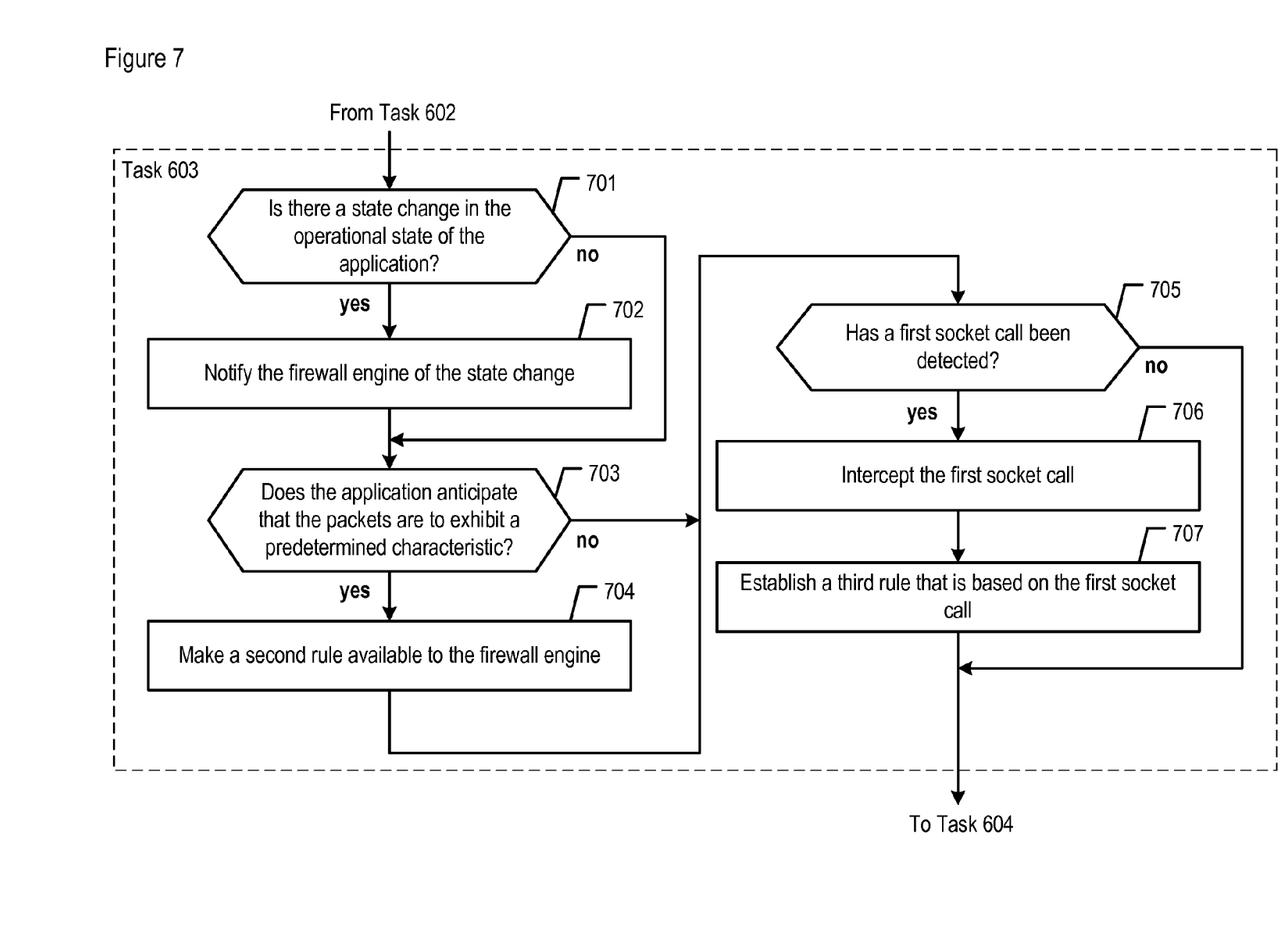
FIG. 7 depicts the salient tasks that concern updating one or both of the resident firewall engine and rules database.
Figure 8:
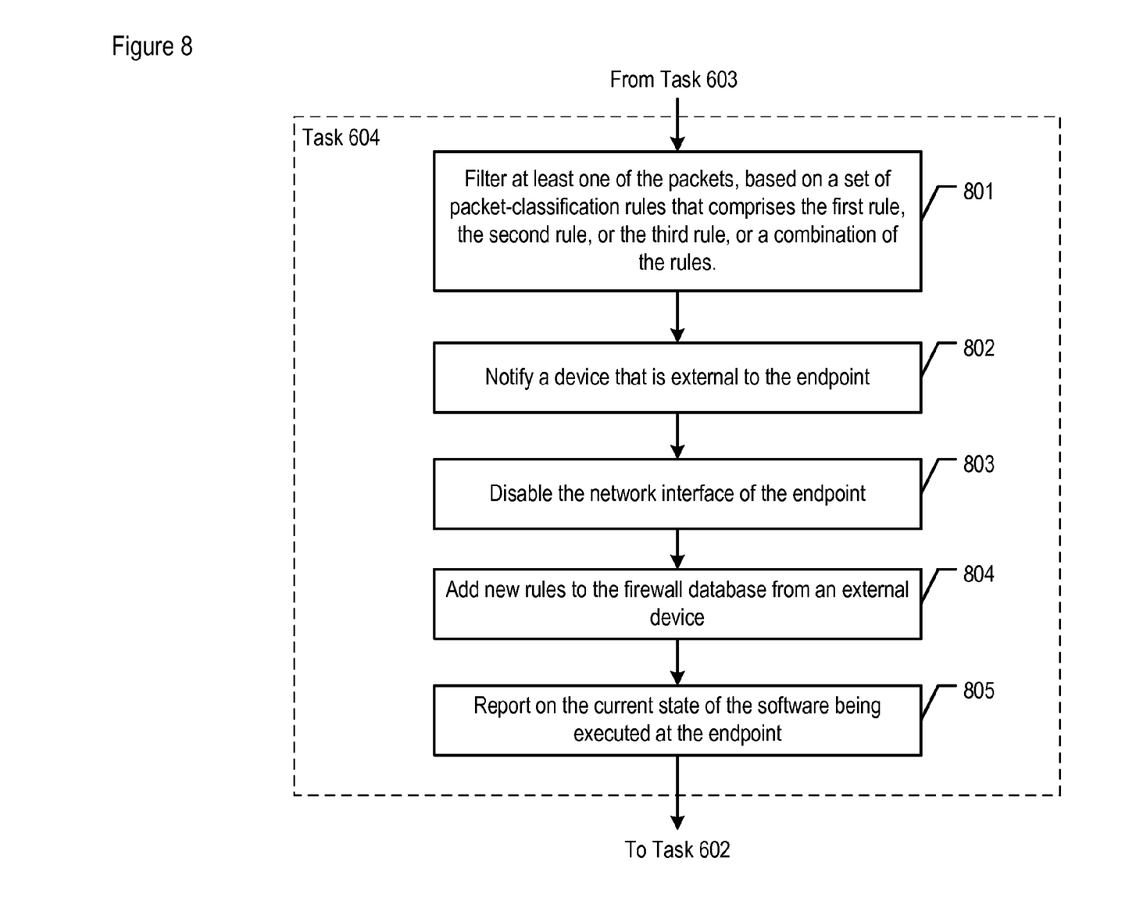
FIG. 8 depicts the salient subtasks that concern taking action on one or more ingress packets.

FIGS. 6 through 8 depict flowcharts of the salient tasks that are executed by telecommunications endpoint 204-*s*, in accordance with the illustrative embodiment of the present invention. The salient tasks concern the handling of ingress packets at endpoint 204-*s*. As those who are skilled in the art will appreciate, some of the tasks that appear in FIGS. 6 through 8 can be performed in parallel or in a different order than that depicted.

FIG. 6 depicts a main set of tasks that are executed by endpoint 204-*s*, in determining if firewall engine 302 or rules database 303 is to be updated. At task 601, endpoint 204-*s* begins executing firewall engine 302 and application 301, wherein engine 302 uses rules database 303 that comprises at least one rule.

At task 602, endpoint 204-*s* checks if engine 302 or database 303 needs to be updated. The points in time when endpoint 204-*s* checks if an update has to occur can be based, for example, on the rate-based rule update technique described in U.S. patent application Ser. No. 11/157,880, filed Jun. 21, 2005, incorporated herein by reference. If engine 302 or database 303 needs to be updated, task execution proceeds to task 603. Otherwise, task execution proceeds to task 604.

At task 603, endpoint 204-*s* updates engine 302 or database 303. Task 603 is described in detail below and with respect to FIG. 7.

At task 604, firewall engine 302 of endpoint 204-*s* takes action on one or more packets. Task 604 is described in detail below and with respect to FIG. 8. Task execution then proceeds back to task 602.

FIG. 7 depicts the salient subtasks of task 603 described above, which subtasks concern updating one or both of firewall engine 302 and rules database 303. At task 701, application 301 determines if a state change has occurred in its operational state. If a state change has occurred, task execution proceeds to task 702. Otherwise, task execution proceeds to task 703.

At task 702, application 301 notifies firewall engine 302 of the state change, as described above and with respect to FIG. 3. In some embodiments, the notification is made possible by adding additional command lines to the application program in which the state change occurs, for each state change that firewall engine 302 needs to know about.

At task 703, if application 301 anticipates that future ingress packets being received from the network are to exhibit a predetermined characteristic, then task execution proceeds to task 704. In other words, application 301 can be, at times, aware of a characteristic of the packet traffic of which firewall engine 302 is unaware. In some embodiments, the predetermined characteristic is encryption, in which the ingress packets are formatted in accordance with an encryption-based protocol (e.g., Secure Real-time Transport Protocol, etc.). If application 301 is not anticipating packets with a predetermined characteristic, task execution proceeds instead to task 705.

At task 704, application 301, uniquely being in a position to know about the packet traffic, makes a rule available to engine 302 (e.g., "allow packets that exhibit a particular authentication code", etc.) by storing the rule in database 303, as described above and with respect to FIG. 4.

At task 705, if middleware layer 504 detects a socket call being made, task execution proceeds to task 706. Otherwise, task execution proceeds to task 604.

At task 706, middleware layer 504 intercepts the socket call being made by application 301. In other words, layer 504 will take action related to rules database 303, in addition to completing the socket call to operating system layer 505.

At task 707, middleware layer 504 takes the action of establishing, in database 303, a rule that is based on the socket call, as described above and with respect to FIG. 5. Task execution then proceeds to task 604.

FIG. 8 depicts the salient subtasks of task 604 described above, which subtasks concern taking action on one or more packets. At task 801, firewall engine 302 filters one or more ingress packets, based on a set of packet-classification rules that comprise one or more of the rules established and made available to engine 302, as described earlier.

In some embodiments, the selection of the particular set of packet-classification rules to be used is based on the state change that engine 302 is notified about at task 702. In some other embodiments, the particular set of rules used is also based on the transitioned-to state (e.g., from an on-hook state to an off-hook state at endpoint 204-*s*, etc.). The filtered packets can be either allowed through or discarded, depending on the packet-classification rules.

At task 802, in some embodiments, engine 302 notifies a device that is external to endpoint 204-*s*, such as an external intrusion detection system or intrusion prevention system. The external system can then take appropriate actions, such as alerting a network administrator or routing critical network traffic to bypass the network region under attack.

At task 803, in some embodiments, engine 302 detects that a packet attack is occurring at endpoint 204-*s* and, as a result, disables network interface 201, thereby taking advantage of the fact that it is co-resident with the network interface at endpoint 204-*s*. This disabling prevents endpoint 204-*s* from being overwhelmed by the sheer intensity of the attack traffic load. Engine 302 can periodically open the network interface to determine if the attack traffic has mitigated in intensity, at which point normal operations can be resumed.

In some embodiments, engine 302 disables network interface 201 for a particular time interval. For example, the time interval can be based on a characteristic of the detected packet attack, such as the intensity of the packet attack.

At task 804, in some embodiments, engine 302 accepts new rules that block attack packets, as a temporary measure when application 301 has been determined to have a new vulnerability and before application 301 is patched to fix the vulnerability. Once the application is patched, the rule is no longer necessary, and engine 302 can remove the rule.

At task 805, engine 302 reports, to an external system, on the current state of the software being executed at endpoint 204-*s*. The state would describe things such as the version number of the software running at endpoint 204-s. The external system can match this information against a database of known vulnerabilities to determine if the software running at endpoint 204-s is susceptible to any attacks. This information can be used to quarantine vulnerable devices. For example, vulnerable endpoints would not be allowed to register with a gatekeeper and would have to refrain from doing so.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
    receiving ingress packets at a telecommunications endpoint during execution by the endpoint of a firewall engine and an application, wherein the application is configured to make socket library calls to an operating system layer;
    when a state change in the operational state of the application occurs during the execution of the application, notifying the firewall engine of the state change, wherein the application performs the notifying;
    filtering, by the firewall engine at the endpoint, at least one of the ingress packets received, based on a first set of packet-classification rules that comprises a first rule, wherein the selection of the first set of packet-classification rules is based on the state change;
    when the application, during its execution, exclusively anticipates that the ingress packets are to exhibit a predetermined characteristic, making a second rule available to the firewall engine as part of the first set of packet-classification rules, wherein the second rule is made available by the application;
    when a first socket library call that is made by the application during its execution is detected, intercepting the first socket library call; and
    when the first socket library call has been intercepted, establishing a third rule that is based on the first socket library call;
    wherein the third rule is part of the first set of packet-classification rules,
    wherein the endpoint is capable, at least in part, of i) receiving a voice signal from a user of the endpoint, ii) digitizing the voice signal, and iii) transmitting a plurality of egress packets that comprise the digitized voice signal.

2. The method of claim 1 wherein the first set of packet-classification rules is also based on the transitioned-to state.

3. The method of claim 2 wherein, as the result of the state change, the application transitioned from a first state that corresponds to an on-hook condition at the endpoint to a second state that corresponds to an off-hook condition at the endpoint.

4. The method of claim 1 further comprising:
    detecting a packet attack at the endpoint; and
    disabling, for a first time interval, a network interface at the endpoint based on the detection of the packet attack, wherein the network interface is for receiving the ingress packets.

5. The method of claim 4 wherein the time interval that is based on a first characteristic of the packet attack.

6. The method of claim 5 wherein the first characteristic is based on the intensity of the packet attack.

7. A method comprising:
    receiving ingress packets at a telecommunications endpoint during execution by the endpoint of a firewall engine and an application, wherein the application is configured to make socket library calls to an operating system layer;
    when the application, during its execution, exclusively anticipates that the ingress packets are to exhibit a predetermined characteristic, making a first rule available to the firewall engine, wherein the first rule is made available by the application;
    filtering, by the firewall engine at the endpoint, at least one of the ingress packets received, based on a first set of packet-classification rules that comprises the first rule;
    when the application, during its execution, exclusively anticipates that the ingress packets are to exhibit a predetermined characteristic, making a second rule available to the firewall engine as part of the first set of packet-classification rules, wherein the second rule is made available by the application;
    when a first socket library call that is made by the application during its execution is detected, intercepting the first socket library call; and
    when the first socket library call has been intercepted, establishing a third rule that is based on the first socket library call;
    wherein the third rule is part of the first set of packet-classification rules,
    wherein the endpoint is capable, at least in part, of i) receiving a voice signal from a user of the endpoint, ii) digitizing the voice signal, and iii) transmitting a plurality of egress packets that comprise the digitized voice signal.

8. The method of claim 7 wherein the predetermined characteristic is encryption.

9. The method of claim 8 wherein the ingress packets are formatted in accordance with a Secure Real-time Transport Protocol.

10. The method of claim 7 further comprising:
    detecting a packet attack at the endpoint; and
    disabling, for a first time interval, a network interface at the endpoint based on the detection of the packet attack, wherein the network interface is for receiving the ingress packets.

11. The method of claim 10 wherein the time interval that is based on a first characteristic of the packet attack.

12. The method of claim 11 wherein the first characteristic is based on the intensity of the packet attack.

13. A method comprising:
receiving ingress packets at a telecommunications endpoint during execution by the endpoint of a firewall engine and an application, wherein the application is configured to make socket library calls to an operating system layer;
when a first socket library call that is made by the application during its execution is detected, intercepting the first socket library call;
when the first socket library call has been intercepted, establishing a first rule that is based on the first socket library call;
filtering, by the firewall engine at the endpoint, at least one of the ingress packets received, based on a first set of packet-classification rules that comprises the first rule;
when the application, during its execution, exclusively anticipates that the ingress packets are to exhibit a predetermined characteristic, making a second rule available to the firewall engine as part of the first set of packet-classification rules, wherein the second rule is made available by the application;
when a second socket library call that is made by the application during its execution is detected, intercepting the second socket library call; and
when the second socket library call has been intercepted, establishing a third rule that is based on the second socket library call;
wherein the third rule is part of the first set of packet-classification rules,
wherein the endpoint is capable, at least in part, of i) receiving a voice signal from a user of the endpoint, ii) digitizing the voice signal, and iii) transmitting a plurality of egress packets that comprise the digitized voice signal.

14. The method of claim 13 further comprising:
when a state change in the operational state of the application occurs during the execution of the application, notifying the firewall engine of the state change, wherein the application performs the notifying; and
wherein the selection of the first set of packet-classification rules is based on the state change.

15. The method of claim 13 wherein the first rule allows the ingress packets from a remote address that is specified in the first socket library call.

16. The method of claim 13 wherein the first rule allows the ingress packets that are destined to a port that is specified in the first socket library call.

17. The method of claim 13 further comprising when a second socket library call that is made by the application during its execution is detected, in which the second socket library call is for closing a socket, removing the first rule from the first set of packet-classification rules.

18. The method of claim 17 wherein a middleware layer performs the detection of the first socket library call and the second socket library call.

19. The method of claim 13 further comprising:
detecting a packet attack at the endpoint; and
disabling, for a first time interval, a network interface at the endpoint based on the detection of the packet attack, wherein the network interface is for receiving the ingress packets.

20. The method of claim 19 wherein the time interval that is based on a first characteristic of the packet attack.

21. The method of claim 20 wherein the first characteristic is based on the intensity of the packet attack.

* * * * *